Patented Nov. 1, 1938

2,135,445

UNITED STATES PATENT OFFICE 2,135,445

METHOD OF PREPARING CEREAL PRODUCT

James F. Walsh, Chicago, Ill., assignor to American Maize-Products Company, a corporation of Maine No Drawing. Application April 23, 1935, Serial No. 17,795

2 Claims. (Cl. 99—80)

This invention relates to a method of making cereal food rich in protein, from certain corn derivatives.

In the manufacture of starch from corn, it is customary to steep the corn and then crack it to release the germ, which is separated off by flotation. The germs which contain the major portion of corn oil are run through presses or expellers to remove the oil, and the resulting meal, after drying, usually goes to the feed house where it is mixed with other products of the refinery operation and sold for stock or cattle feed. I have discovered that this meal cake can advantageously be used for human consumption, if it is carefully washed with water to remove certain water-soluble bitter constituents, then subjected to a pre-pasting operation to convert the starch present into a paste form, then shaped after drying and finally toasted and flavored or sweetened. The resulting product is high in protein and other valuable constituents and has an excellent flavor, making it available for use in human diet.

In manufacturing my new product, the oil meal from the oil presses is thoroughly washed in any suitable apparatus with cold water and it will be found that this washing will remove those constituents which give to the oil cake an objectionable bitter taste, but the resulting product is rather tasteless and unpalatable. It will be found that the oil cake ordinarily contains a considerable quantity of starch which has gone over with the germ, and this starch is utilized and saved in my process, for after the washing step is completed, the meal which usually will comprise from about 15 to 20% of starch is heated at a temperature of approximately 212° F. to drive off the excess water and to convert the starch into a paste. If, at this stage it is found that the cake contains too little starch, some additional starch may be added, though this ordinarily will not be necessary. By holding the batch at a temperature of approximately 212° F. for a suitable time, for example, 15 minutes, the material will be sterilized and the starch will be converted into a paste so that the whole mass will assume the form of a heavy slurry or paste. Excess water may be driven off either by an additional cooking or by a filtering or pressing operation and the paste converted into substantially dry form in any convenient shape. For example, it may be freed from water to the point where it can be extruded in rods or other desired shapes and then dried; or the paste may be dried on a rotary drier and then reduced to flakes or granules. The drying temperature preferably ranges from 125° to 160° F. The resulting mass is now flavored and toasted and the order of these steps is unimportant except that if the flavoring is done subsequent to the toasting, a re-drying ordinarily will be necessary.

The toasting operation may be carried out in any suitable heating apparatus or oven at a sufficient temperature to brown the material slightly so that it is substantially cooked and rendered more palatable and digestible.

The flavoring step may consist of sweetening by any desired form of sweetening agent such as sugar, or a syrup may be selected having a flavor in addition to its sweetness. For example, I have found that very palatable results can be had by mixing about 15% of corn syrup with about 85% of the prepared cereal. These proportions may of course be varied as desired. Other sugars derived from corn or other sources may also be used, and another suitable flavoring material is sodium glutamate which may be used in approximately the same proportions as the syrup or slightly less of this material may be employed.

After the flavoring and toasting it will be found that the resulting product is a brown cereal food containing from 18% to 22% or more of protein, between about 15% and 20% of starch, potassium ranging ordinarily above 2% and in some instances up to 6%, as well as small quantities of oil and mineral salts in addition to water and the like. These proportions are given only by way of indication, as they will vary somewhat with the different batches and depend upon the refinery operations used in preparing the raw materials for my process, but these figures give an approximate indication of the nature of the product. The product thus obtained is a valuable food which may be comminuted and used as a flour or may be prepared in special form as flakes and used as a prepared cereal. It also is suitable as a substitute for nut meats in cookery generally and in ground nut meats and in confections.

By starchy corn-oil meal in the claims is meant meal having either naturally inherent starch or starch added thereto or having both inherent and added starch.

What I claim is:

1. A process of preparing a palatable food product from corn germs containing starch and proteins comprising pressing the germs to express the oil therefrom, washing said germs with water to remove the water-soluble bitter constituents without removing said starch and proteins, heating said washed germs containing starch and proteins sufficiently to expel the excess water and to gelatinize the starch to form a paste, and drying said paste.

2. A process of preparing a palatable food product from corn germs containing starch and proteins comprising pressing the germs to express the oil therefrom, washing said germs with cold water to remove the water-soluble bitter constituents without removing said starch and proteins, and heating said washed germs at about 212° F. to form a heavy paste, forming said paste into desired shapes then drying, toasting and flavoring.

JAMES F. WALSH.